July 1, 1952 W. G. HOLMES 2,602,107
WEATHER-RESISTANT SUPPORT AND HOUSING
FOR ELECTRICAL DEVICES
Filed May 8, 1948
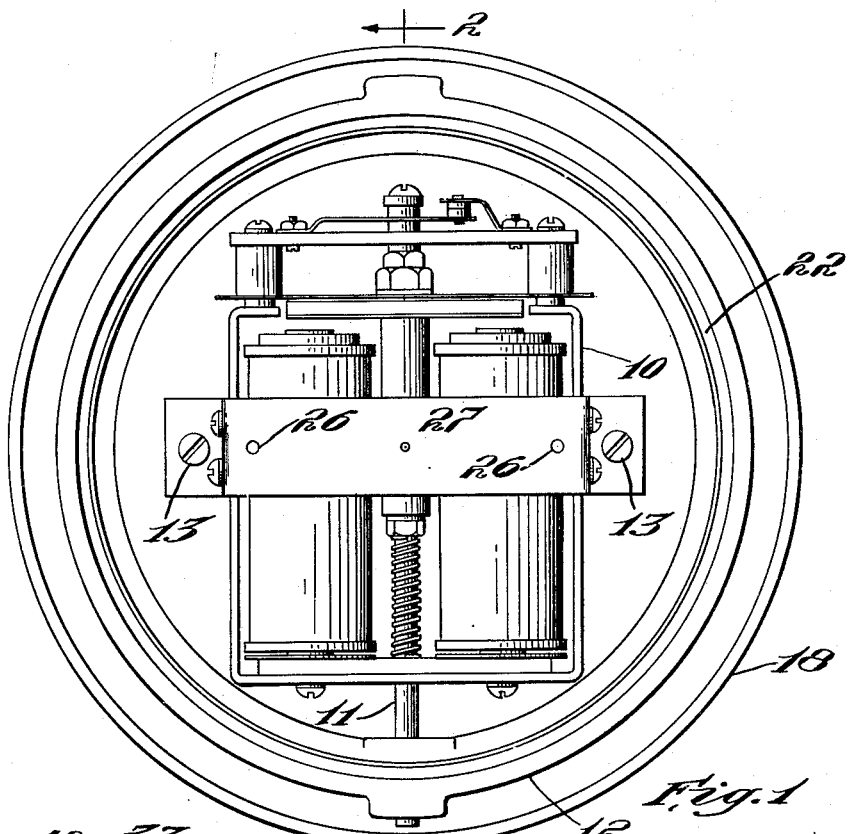
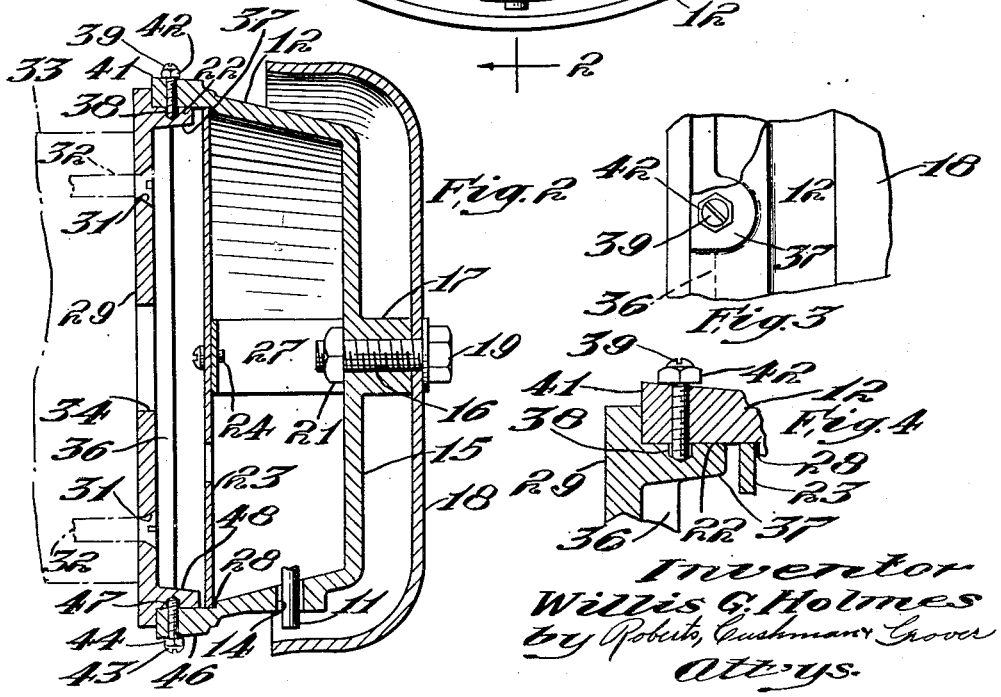
Inventor
Willis G. Holmes
by Roberts, Cushman & Grover
Attys.

Patented July 1, 1952

2,602,107

UNITED STATES PATENT OFFICE 2,602,107

WEATHER-RESISTANT SUPPORT AND HOUSING FOR ELECTRICAL DEVICES

Willis G. Holmes, Pembroke, Mass.

Application May 8, 1948, Serial No. 25,934

1 Claim. (Cl. 174—52)

It is often necessary to locate electrically operated mechanisms, such as fire alarm or warning bells, in high or otherwise inaccessible positions which are in many cases exposed to the elements. It is, therefore, desirable that the housing for such mechanisms be simple to mount and to remove so installation and maintenance problems are minimized, and that the housing at the same time be weather-resistant to protect the working parts from corrosion.

Objects of this invention are to provide a housing for an electrical mechanism which can be easily installed, which can be opened readily to permit maintenance of the enclosed mechanism, which is weather-resistant, which is simple and economical to construct, and which generally advances the art of manufacture of such housings.

In a broad aspect the invention contemplates a housing for an electrical mechanism comprising a casing for securing the mechanism which has an open end with a tightly fitting cover substantially completely to enclose the mechanism. A mounting plate is joined to the surface upon which the mechanism is to be mounted by any one of the well-known conventional means of attaching electrical fixtures. A fastening device is used to maintain the casing at the end in intimate contact with the plate, thereby to secure the casing to the plate and to provide a weather-resistant enclosure for the mechanism which can be readily opened.

In a specific aspect the invention contemplates a housing upon which is mounted the gong and the electrical mechanism for operating the striker of an alarm bell. The housing comprises a casing for securing the mechanism which has one circular open end with a recess in the wall thereof; a closed end with a threaded aperture in the center thereof; and a hole in the bottom through which projects the bell striker. The gong is fastened to the closed end of the housing by a bolt threaded into the aperture sufficiently so that the bolt end projects within the casing. The bolt is secured by a locknut on the projecting end thereof. The mechanism is substantially completely enclosed within said casing by a circular cover held tightly fitted within said recess by two screws which are threaded into said mechanism. The casing is made weather-resistant by forcing a sealing compound into the joint between the cover and casing.

A mounting plate fastened to a conventional electrical outlet box by any of the usual means has a circular rabbet thereupon for mating with the recess in the wall of the open end of the casing. To maintain the casing in intimate contact with the plate, an ear projects from the top of the plate with an aperture therein for engagement with a pin-shaped member projecting from the casing so that the casing hangs from the plate. A second ear projects from the bottom of the plate to engage a locking member to maintain the rabbet in engagement with the recess.

These and other objects and aspects of the invention will be apparent from the description of a specific embodiment thereof shown in the accompanying drawing in which Fig. 1 is a rear elevation view of the casing with the cover removed;

Fig. 2 is a cross sectional view on line 2—2 of Fig. 1;

Fig. 3 is an enlarged fragmentary detail plan view of the pin-shaped member; and Fig. 4 is an enlarged fragmentary detail elevation view of the pin shaped member.

As illustrated in Fig. 1, an electrical mechanism such as the actuating 10 for the striker 11 of an alarm bell is secured to a casing 12 by the screws 13. The casing 12 is approximately cylindrical in shape (Fig. 2) having a hole 14 in the bottom thereof through which projects the striker 11. This hole 14 also acts as a drain for any moisture which may condense within the casing 12, or otherwise collect therein. One end 15 of the casing 12 is closed and has a centrically located boss 17 with a threaded aperture 16. A bell gong 18 is fastened to the end of the boss 17 by means of a bolt 19 which engages the threads of the aperture 16. To prevent tampering or the removal of the gong 18, the threaded end of the bolt 19 is made long enough to extend within the casing 12 so that a locking nut 21 can be threaded thereupon.

The other end of the casing 12 is open, the wall adjacent this end having an offset portion to form a circular recess 22. The mechanism 10 is substantially completely enclosed within the casing 12 by means of a circular cover 23 tightly fitting within the recess 22. The cover 23 is maintained in position by two screws 24 engaging the tapped holes 26 in the frame 27 of the mechanism 10. At assembly the casing 12 is buttered with sealing compound 28 so that the joint between the casing 12 and the cover 23 is made weather-resistant.

A mounting plate 29 has the holes 31 counter sunk for the flat-headed screws 32 which provide a means for joining the plate to an electrical outlet box of the conventional type shown at 33. An aperture 34 is located centrically in the plate 29 so that the electrical source conductors (not shown) can be brought into the casing 12.

The housing is also arranged to be mounted without the use of an electrical outlet box 33. When such a mounting is employed, the plate 29 is fastened directly to the wall or other vertical surface by the screws 32 so that the ends of the electrical source conductors project through the aperture 34. These conductors are connected to the leads (not shown) from the mechanism 10 in any conventional manner, the space between the plate 29 and the cover 23 being provided for such connections.

A tongue 36 projects from the face of the plate 29 to engage the recess 22 in the casing 12. An ear 37 provided at the top of the plate 29 has an aperture 38 (Fig. 4) therein for engaging a pin-shaped member such as the screw 39 held in a projecting position from a boss 41 on the casing 12 by a locknut 42. A similar screw 43 with a locknut 44 threaded into a boss 46 on the casing 12 acts as a locking member by engaging an aperture 47 in an ear 48 on the bottom of the mounting plate 29. When it is desirable to make the housing weather-resistant, this rabbeted joint is also buttered with sealing compound.

The housing is mounted by first permanently joining the plate 29 by means of screws 32 to the outlet box 33 located at the desired position, a relatively easy operation because of the light weight and convenient shape of the plate.

The electrical connections of the mechanism leads to the source conductors are then made by either solderless connectors or the usual soldered joints. After these connections are finished, the tongue 36 is slipped into the recess 22 and the screws 39 and 43 tightened so that the casing 12 is held in intimate contact with the plate 29 thus forming a relatively tight enclosure because of the close fit of the rabbeted joint. When a weather-proof housing is required, additional protection is provided by buttering the tongue 36 with sealing compound before assembly in the recess 22.

Whenever the bell mechanism 10 requires maintenance or repairs, the above procedure is reversed. The rabbeted joint and electrical connections are readily broken so that the casing 12 and mechanism 10 can be taken to the bench before the sealing compound 28 is broken. Whatever maintenance work or adjustments are required, these can be performed safely and easily under good working conditions rather than in a precarious and exposed location, and the mechanism then returned and quickly replaced in its weather-resistant housing.

It should be understood that the present disclosure is for the purpose of illustration only and that this invention includes all modifications and equivalents which fall within the scope of the appended claim.

I claim:

A housing for mounting the gong and electrical mechanism operating the striker of an electric bell upon an outlet box comprising a casing wherein said mechanism is supported, said casing having a closed end with a threaded aperture in the center thereof and a hole in the bottom thereof through which projects said striker, the opposite end of said casing being open and the adjacent portion of the casing wall being recessed to form a rabbet, a bolt threaded in said aperture with its end projecting within said casing for fastening said gong to said housing, a lock nut on said end for securing the bolt, a cover tightly fitting within said rabbet thereby substantially completely to enclose said mechanism, a mounting plate having a tongue for engaging the rabbet so that the casing is supported thereby, and fastening means for preventing the separation of the tongue and rabbet whereby the gong cannot be removed without first dismounting the casing from the plate and removing the cover.

WILLIS G. HOLMES.

REFERENCES CITED

The following references are of record in the file of this patent:

UNITED STATES PATENTS

| Number | Name | Date |
| --- | --- | --- |
| 1,239,850 | Vogel | Sept. 11, 1917 |
| 1,261,874 | Van Ranst | Apr. 9, 1918 |
| 1,839,342 | Richmond | Jan. 5, 1932 |
| 1,963,926 | Deary | June 12, 1934 |
| 2,041,995 | Edwards | May 26, 1936 |
| 2,425,250 | Lamb | Aug. 5, 1947 |